(12) United States Patent
Miura

(10) Patent No.: US 6,888,561 B2
(45) Date of Patent: May 3, 2005

(54) BEAM CONTROL DEVICE

(75) Inventor: Tatsuyuki Miura, Fujisawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/414,384

(22) Filed: Apr. 16, 2003

(65) Prior Publication Data
US 2003/0197778 A1 Oct. 23, 2003

(30) Foreign Application Priority Data
Apr. 18, 2002 (JP) ..................... 2002-116213

(51) Int. Cl.$^7$ ............................. B41J 2/47
(52) U.S. Cl. .................... 347/250; 347/235
(58) Field of Search .................. 347/235, 250, 347/234, 248

(56) References Cited

U.S. PATENT DOCUMENTS 6,285,388 B1 * 9/2001 Miura ................ 347/235
6,323,889 B1 * 11/2001 Miura ................ 347/234

FOREIGN PATENT DOCUMENTS

JP 2000-141756 A 5/2000

* cited by examiner

Primary Examiner—Huan Tran
(74) Attorney, Agent, or Firm—Foley & Lardner LLP

(57) ABSTRACT

According to a beam control device of the present invention, if an exposure device including a light emitting section is instructed to form an image and a predetermined current is then supplied to an application specific integrated circuit and a main control section, then the main control section outputs an light emitting section on signal. Then, the light emitting section outputs light having its intensity changed according to image information.

7 Claims, 3 Drawing Sheets

BEAM CONTROL DEVICE

CROSS-REFERENCE TO RELATED APPLICATIONS

This application is based upon and claims the benefit of priority from the prior Japanese Patent Application No. 2002-116213, filed Apr. 18, 2002, the entire contents of which are incorporated herein by reference.

BACKGROUND OF THE INVENTION

1. Field of the Invention

The present invention relates to a beam control device in an exposure device incorporated into a digital copying apparatus or the like, the beam control device controlling a light beam.

2. Description of the Related Art

An exposure device is known which is applicable to, for example, an image forming apparatus such as a digital copying apparatus and which exposes a charged area of a photosensitive drum to a light beam such as a laser beam.

The exposure device has a semiconductor laser element that emits a laser beam, an optical member that sets the diameter of the laser beam emitted by the semiconductor laser element, at a value corresponding to a desired resolution, a polarizing device that polarizes the laser beam so that the beam travels in a main scanning direction (along an axial direction of the photosensitive drum), an image forming lens system that forms the laser beam polarized by the polarizing device into a substantially linear image at a predetermined position on the photosensitive drum, and other components.

Further, the exposure device comprises an application specific integrated circuit (ASIC) and a central processing unit (CPU) acting as a control section. For example, the ASIC converts image data read by a scanner or the like into image data that can be used to drive the semiconductor laser element. Then, the intensity of the laser beam emitted by the semiconductor laser element is changed on the basis of the converted image data.

The laser beam is polarized by the polarizing device and is partly detected by a horizontal synchronizing sensor. The laser beam detected by the sensor yields a horizontal synchronizing signal. The ASIC changes the intensity of the laser beam outputted by the semiconductor laser element, according to the image data read by the scanner or the like. In this manner, on the basis of the horizontal synchronizing signal generated by the horizontal synchronizing sensor, the intensity of the laser beam is changed according to an density of image data corresponding to one line in the main scanning direction. Then, in many exposure devices, when an instruction to form an image, i.e. to start exposure is given, a predetermined control signal is supplied to the ASIC and CPU. Then, the ASIC first outputs control image data (or a reference signal) used to change the intensity of the laser beam outputted by the semiconductor laser element, according to the image data read by the scanner or the like, the laser beam being outputted on the basis of the read image data. Accordingly, if the ASIC and the CPU are activated correctly, the semiconductor laser element emits the laser beam having its intensity changed so as to correspond to the control image data.

Whether or not the ASIC has been activated normally can be determined depending on whether or not the horizontal synchronizing sensor is outputting a horizontal synchronizing signal indicating that the laser beam emitted by the semiconductor laser element has been detected.

If the horizontal synchronizing sensor is outputting a horizontal synchronizing signal, the ASIC supplies control image data to the semiconductor laser element to cause the semiconductor laser element to output a predetermined laser beam.

In contrast, if the ASIC is not activated correctly, the semiconductor laser element does not output any laser beams having their intensities changed so as to correspond to control image data. Consequently, the horizontal synchronizing sensor does not output any horizontal synchronizing signals. In this case, the CPU determines that a laser driving circuit is abnormal or that an error has occurred during the activation of the ASIC.

However, noise or the like may hinder the ASIC from timely supplying control image data to the semiconductor laser element even though the ASIC has been activated normally. As a result, the semiconductor laser element may fail to output a laser beam corresponding to the control image data (even if it is outputted, the timing for outputting may be later than a predetermined one).

In this case, even if the ASIC is activated correctly, the CPU disadvantageously detects an error to stop the subsequent operations.

BRIEF SUMMARY OF THE INVENTION

It is an object of the present invention to provide a beam control device that can cause a laser beam corresponding to image data to be reliably outputted by detect that an ASIC (a laser driving circuit) is activated normally which causes a semiconductor laser element to emit a laser beam corresponding to image data.

According to an aspect of the invention, abeam control device comprising:

a beam scanning section including a polarizing device which polarizes a light beam, to polarize the light beam so that the beam travels in a first direction;

horizontal synchronizing signal generating means for generating a horizontal synchronizing signal by detecting a light beam from the beam scanning section;

an application specific integrated circuit which controls a light beam from the beam scanning section according to image data, in response to the horizontal synchronizing signal from the horizontal synchronizing signal generating means; and a central processing unit which controls the polarizing device of the beam scanning section;

wherein after the application specific integrated circuit and the central processing unit have been activated, the central processing unit controls start of generation of a light beam by the beam scanning section, and if the horizontal synchronizing signal generating means generates a horizontal synchronizing signal, the integrated circuit starts controlling the light beam.

According to another aspect of the invention, an image forming apparatus which forms an image based on an electrostatic latent image, the apparatus comprising:

a light source which emits light of a predetermined wavelength;

polarizing means for polarizing the light from the light source so that the light travels along a first direction;

horizontal synchronizing signal detecting means for detecting the light from the light source which has been polarized by the polarizing means and outputting a horizontal synchronizing signal on the basis of a result of the detection;

a first processing device which causes the light source to emit the light of the predetermined wavelength in response to the horizontal synchronizing signal from the horizontal synchronizing signal generating means; and a second processing device which associates the light of the predetermined wavelength from the light source, with image data and causes the polarizing means to polarize the light using a predetermined timing.

According to still another aspect of the invention, a method of controlling a laser beam position in an image forming apparatus including an exposure device a light source which emits light of a predetermined wavelength, polarizing means for polarizing the light from the light source so that the light travels along a first direction, and a first processing device and a second processing device which control the light source and the polarizing means in order to expose an exposure position to light on the basis of image data read by an image reading section, the method comprising:

if a predetermine current is supplied to the first processing device and the second processing device, using the first processing device to cause the light source to emit light having first information;

causing the second processing device to operate synchronously with information indicating that the light having the first information has been detected;

using the second processing device to cause the light source to second information corresponding to an object to be read;

if that part of the light emitted by the light source and having the second information to which a predetermined area is exposed, causing the first processing device to detect that part of the light having the second information which is used to expose a next predetermined area;

causing the first processing device to check whether or not the detected information is being provided to the second processing device;

using the second processing device to allow emission of that part of the light having the second information which is used to expose the next predetermined area, the emission being synchronous with the detected information; and before the detected information is provided to the second processing device, causing the first processing device to check whether the detected information is being provided to the second processing device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the present invention will be described with reference to the drawings.

Figure 1:
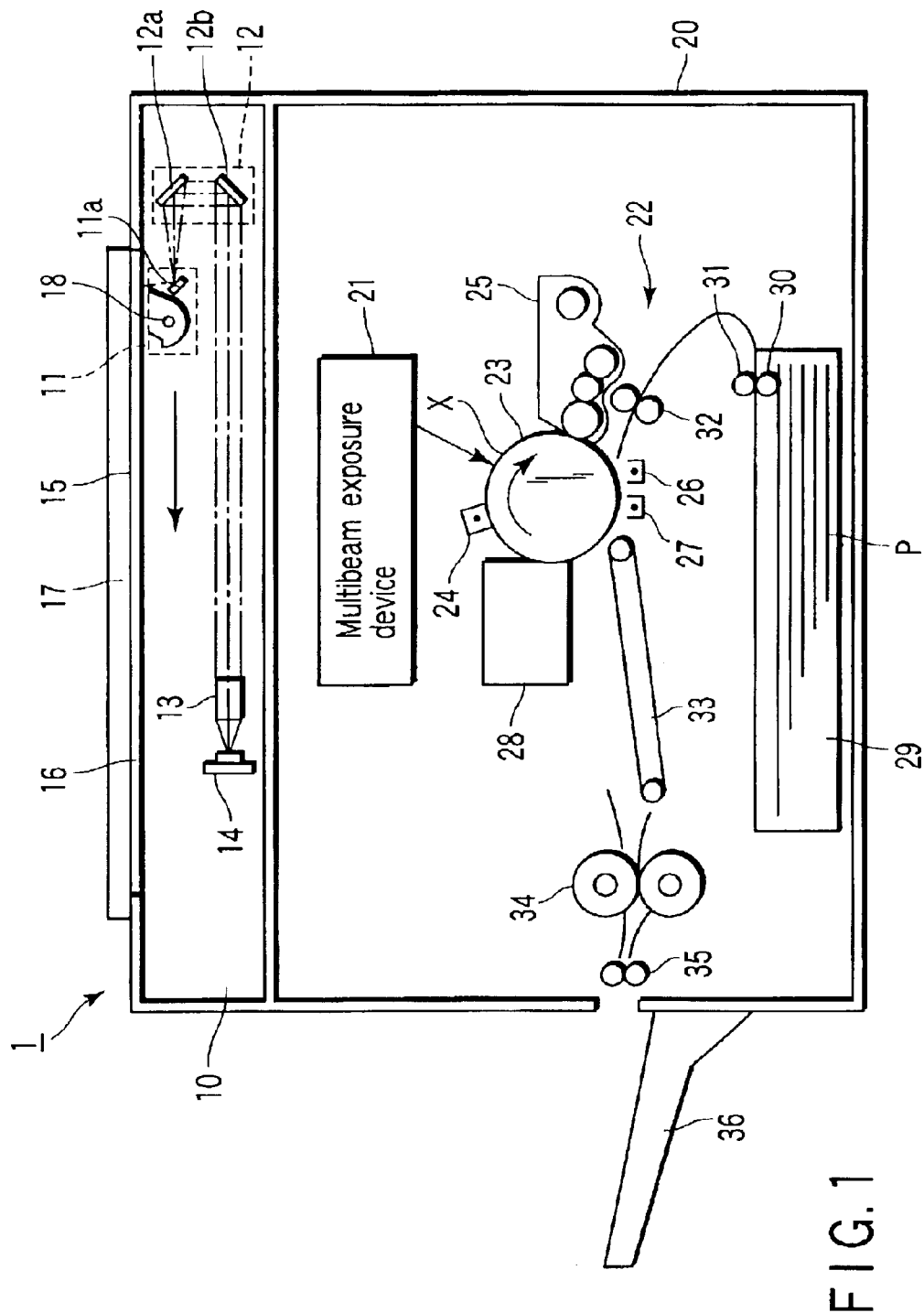
FIG. 1 is a schematic view showing a configuration of a digital copying apparatus having an exposure device to which an embodiment of the present invention is applied.

FIG. 1 schematically shows a configuration of a digital copying apparatus having an exposure device to which the present embodiment is applied.

The digital copying apparatus 1 has a scanner section 10 and a printer section 20.

The scanner section 10 has a first carriage 1 formed so as to be movable in the direction of an arrow in the figure, a second carriage 12 moved so as to follow the first carriage 11, an optical lens 13 that provides light from the second carriage 12 with predetermined image forming characteristics, a photoelectric converting element 14 such as a CCD sensor which photoelectrically converts the light provided with the predetermined image forming characteristics by the optical lens 13, to output an electric signal, an original table 16 that holds an original 15, an original fixing cover 17 that tightly contacts the original 15 with the original table 16, and other components.

The first carriage 11 is provided with a light source 18 that illuminates the original 15 and a mirror 11a that reflects light reflected by the original 15 illuminated by light emitted by the light source 18, toward the second carriage 12.

The second carriage 12 is provided with a mirror 12a that bends light transmitted by the mirror 11a of the first carriage 11, through 90°, and a mirror 12b that further bends light bent by the mirror 12a, through 90°.

Light reflected by the original 15 placed on the original table 16 and illuminated by the light source 18 impinges against the optical lens 13 via the mirrors 11a, 12a, and 12b as image light. The reflected light contains different levels of brightness corresponding to the presence or absence of image information in the original 15.

Image light incident on the optical lens 13 is collected on a light receiving surface of the photo electric converting element 14 by the optical lens 13. The image light from the original 15 is sequentially collected on the photoelectric converting element 14 by moving the first carriage 11 and the second carriage 12 along the original table 16. The photoelectric converting element 14 converts the image light into a digital signal corresponding to the density of the image.

The printer section 20 has an exposure device 21 that outputs light having its intensity changed so as to correspond to image data, and an image forming section 22 that forms an image corresponding to the light provided by the exposure device 21, on a recording sheet P by an electrophotographic method.

The image forming section 22 comprises a drum-shaped photosensitive member having a photosensitive layer formed on its surface, i.e. a photosensitive drum 23, a charging device 24 that applies a potential of a predetermined polarity to the surface of the photosensitive drum 23, a developing device 25 that supplies toner to a latent image formed on the surface of the photosensitive drum 23 by the exposure device 21, to develop the image, a transfer device 26 that applies an electric field to a toner image formed by development carried out by the developing device 25, to transfer the toner image to the recording sheet P, a separating device 27 that separates the recording paper P to which the toner image has been transferred, from the photosensitive drum 23, a cleaning device 28 that removes toner remaining on the surface of the photosensitive drum 23 after the toner image has been transferred to the sheet P, to return the potential distribution of the photosensitive drum 23 to its state prior to charging, and other components.

The charging device 24, the developing device 25, the transfer device 26, the separating device 27, and the cleaning device 28 are sequentially arranged along the direction of an arrow in which the photosensitive drum 23 is rotated. Further, a laser beam from the exposure device 21 is applied to an exposure position X between the charging device 24 and the developing device 25.

An image processing section (not shown) executes, for example, edge enhancement or a half-tone-processing for half tone images on an image signal read from the original 15 by the scanner section 10, to convert this signal into a print signal. A semiconductor laser element in the exposure device 21 outputs a laser beam having its intensity changed according to the print signal.

A laser beam from the exposure device 21 forms an electrostatic latent image corresponding to the print signal, at the exposure position X in the photo-sensitive drum 23. The electrostatic latent image formed on the surface of the photosensitive drum 23 is developed using toner from the developing device 25, and is then carried to a position opposite to the transfer device 26 by rotating the photosensitive member 23.

On the other hand, one recording sheet P is taken out of a sheet cassette 29 by a sheet feeding roller 30 and a separating roller 31. The sheet P is then carried to a transfer position at which the transfer device 26 and the photosensitive drum 23 are opposite each other while required timings are being adjusted by an aligning roller 32. The toner image formed on the photosensitive drum 23 is thus transferred to the recording sheet P at the transfer position by an electric field from the transfer device 26.

The recording sheet P to which the toner image has been transferred is separated from the photosensitive drum 23 by the separating device 27 and then guided to a fixing device 34 by a carrying device 33. The fixing device 34 then heats and presses the recording sheet P guided to the fixing device 34, to fix the electrostatically attached toner. The sheet P to which the toner is fixed is discharged to a tray 36 by a sheet discharging roller 35.

On the other hand, the photosensitive drum 23 to which the toner image has been transferred by the transfer device 26 continues to be rotated. The cleaning device 28 removes toner remaining on the surface after the transfer. Furthermore, the cleaning device 28 returns the photosensitive drum 23 to its initial condition set before the potential is supplied to its surface. Then, the next image can be formed.

Continuous image formation can be accomplished by repeating the above steps.

Figure 2:
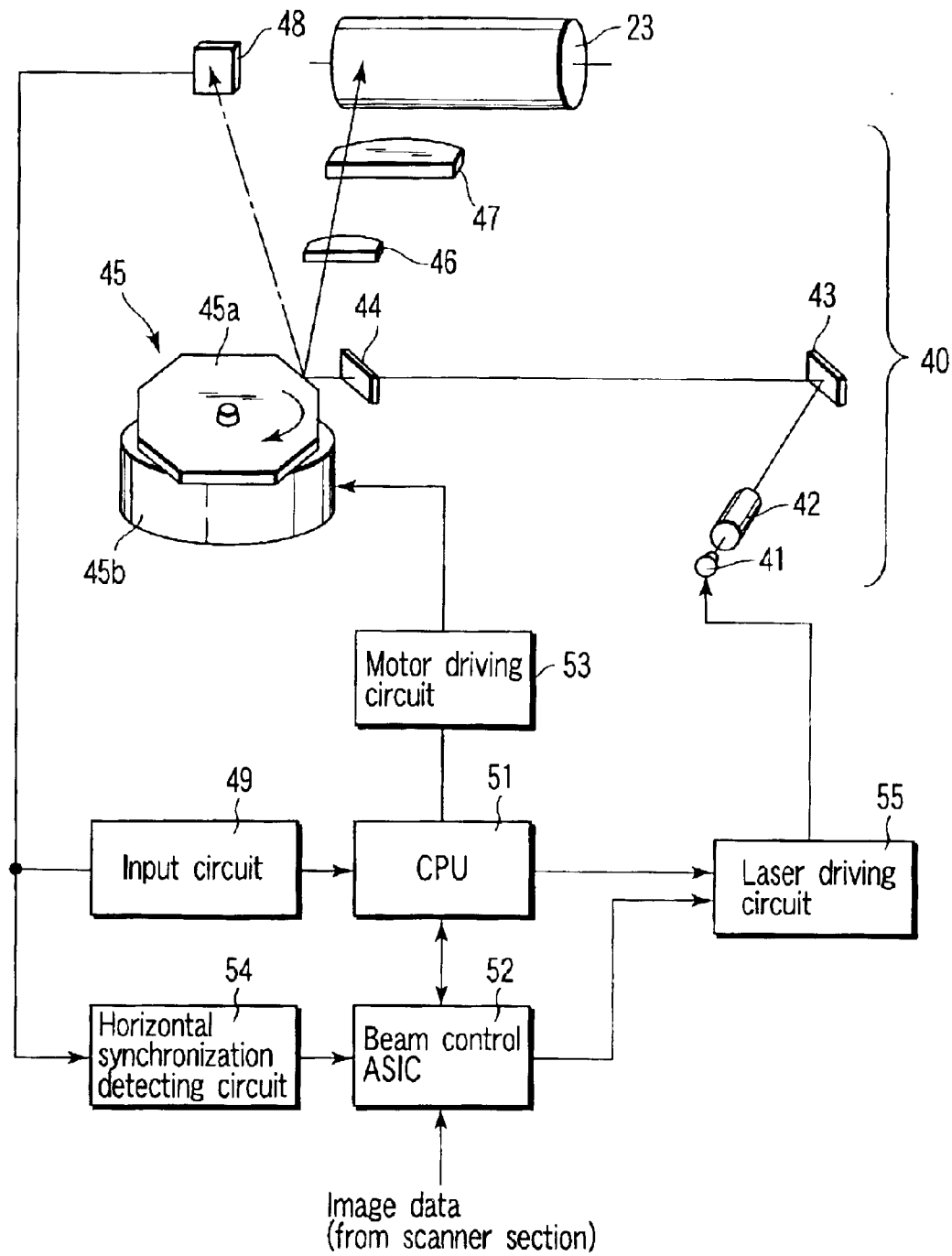
FIG. 2 is a schematic view illustrating an example of an exposure device incorporated into the digital copying apparatus shown in FIG. 1.

Now, with reference to FIG. 2, description will be given of an example of an exposure device incorporated into the digital copying apparatus shown in FIG. 1. FIG. 2 shows the exposure device 21 from which a housing (body frame) has been removed and some mirrors are omitted and in which optical paths of laser beams are shown on the same plane.

The exposure device 21 is provided with a beam scanning section 40 that can collect, on the photosensitive drum 23, exposure light having its light intensity changed so as to correspond to image data to be outputted.

The beam scanning section 40 includes a semiconductor laser element 41 that can output light of a predetermined wavelength (hereinafter referred to as a "laser beam"), a polarizing device 45 that polarizes the laser beam outputted by the laser element 41 so that the beams travels parallel with the axial direction of the photosensitive drum 23, and a first and second lenses 46 and 47 that substantially linearly collect the laser beam polarized by the polarizing device 45, at the exposure position X.

The polarizing device 45 is a rotating reflector in which a regular polyhedral polygon mirror 45a provided with, for example, an 8-faced planar reflection mirror is rotated at a predetermined rotation speed by a motor 45b.

A laser beam from the semiconductor laser element 41 is continuously guided from one axial end of the photosensitive drum 23 to its other axial end by rotating the polygon mirror 45a.

The following components are included between the laser element 41 and the polarizing device 45: a finite focus (non-collimator) lens 42 that adjusts the cross section of a laser beam from the laser element 41 to a predetermined shape, a mirror 43 that reflects the laser beam passed through the finite focus lens 42, in a predetermined direction (the mirror 43 can maintain a certain degree of freedom of the optical path between the lens 42 and the polarizing device 45), and a cylinder lens 44 that provides a convergent nature to the laser beam passed through the lens 42, only in a direction orthogonal to the axial direction of the photosensitive drum 23. The finite focus lens 42 may be, for example, an aspherical glass lens, an aspheric lens comprising an aspheric plastic lens stuck to a glass lens, or an integrated lens comprising a glass lens having, for example, an ultraviolet setting resin set on its arbitrary lens face so as to have a predetermined shape.

A laser beam of a predetermined wavelength emitted by the semiconductor laser element 41 has its divergent nature weakened by the finite focus lens 42, which provides the laser beam with a convergent nature. The laser beam is then guided to the mirror 43. The laser beam reflected by the mirror 43 is provided with a convergent nature at least in a sub-scanning direction by the cylinder lens 44. The laser beam is then guided to the polygon mirror 45a.

A beam position detecting sensor 48 is provided at an arbitrary position being as optically distant as the surface of the photosensitive drum 23 and to which the laser beam polarized by the polygon mirror 45a guided. The beam position detecting sensor 48 detects that the laser beam emitted by the second image forming lens 47 has reached a predetermined position in the outer periphery of the photosensitive drum 23 (passage timing), the predetermined position being located in front of the exposure position X (image forming area) in the main scanning direction. The beam position detecting sensor 48 also detects this predetermined position.

The exposure device 21 also has a central processing unit (CPU) 51 and an application specific integrated circuit (ASIC) 52 for beam control.

The exposure device 21 further has, for example, a motor driving circuit 53 that rotates a motor 45b at a predetermined rotation speed, the motor 45b rotating the polygon mirror 45a, a horizontal-synchronization detecting circuit 54 that detects in an output from the beam position detecting sensor 48 that a laser beam available as a trigger to obtain a horizontal synchronizing signal has reached the beam position detecting sensor 48, and a laser driving circuit 55 that supplies a predetermined base current to the semiconductor laser element 41 and changes the intensity of a laser beam outputted by the laser element 41, on the basis of image data.

The beam control ASIC 52 supplies a laser driving signal to the laser driving circuit 55 for each line synchronously with a horizontal synchronizing signal from the horizontal-synchronization detecting circuit 54, the laser driving signal corresponding to image data read by the scanner section 10 and converted into an image signal that changes the intensity of a laser beam from the semiconductor laser element 41.

The motor driving circuit 53 outputs, to the motor 45b, a motor driving pulse used to rotate the motor 45a for the polarizing device 45 at a predetermined rotation speed.

Now, with reference to FIG. 3, description will be given of steps in which the exposure device shown in FIG. 2 exposes the photosensitive drum to image light.

Figure 3:
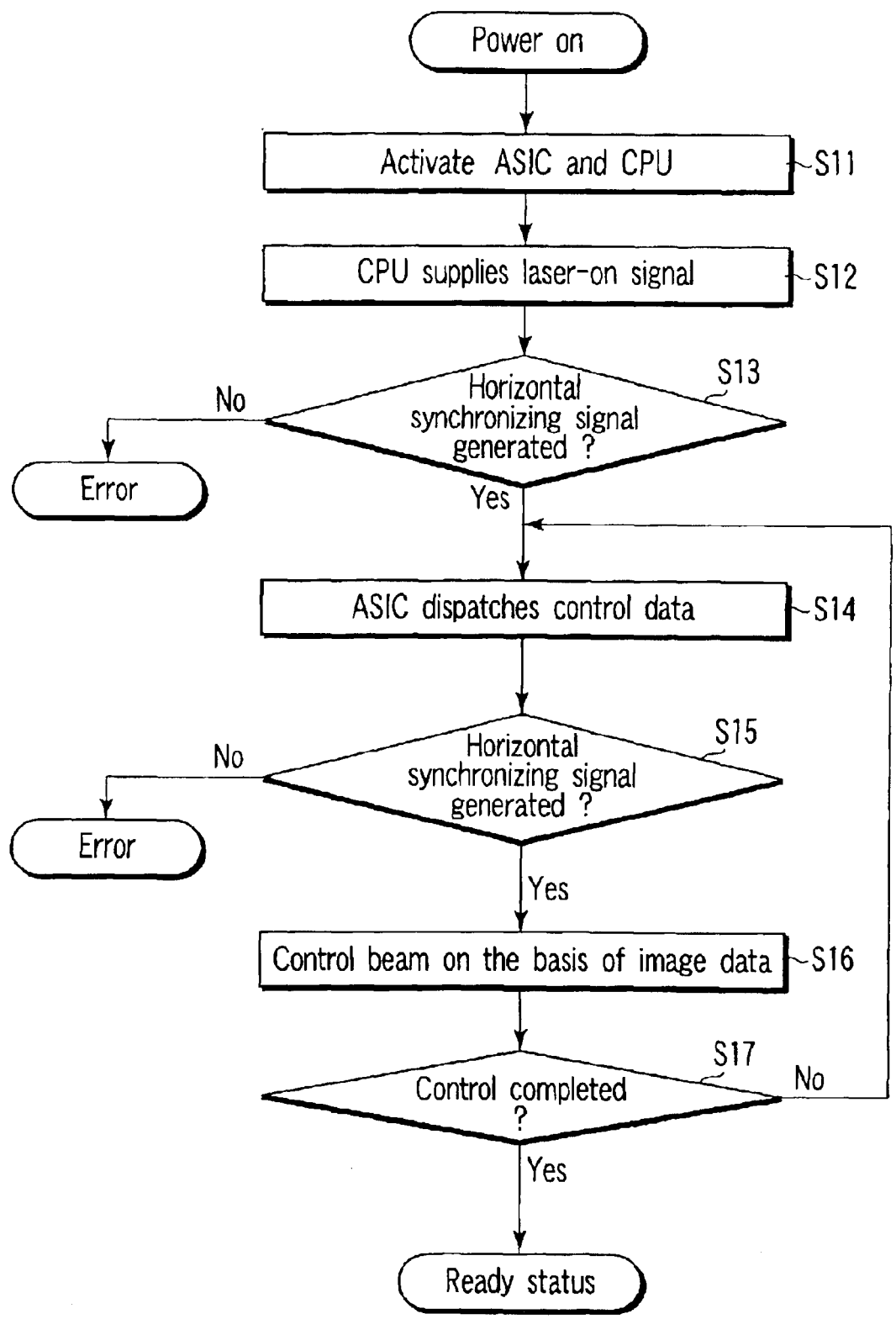
FIG. 3 is a flow chart illustrating steps in which the exposure device shown in FIG. 2 exposes a predetermined exposure position to light.

As shown in FIG. 3, with the exposure device 21, when an instruction to form an image, i.e. to carry out exposure is given or a power supply switch (not shown) of the copying apparatus is turned on to start an initial operation, a predetermined control signal is supplied to the beam control ASIC 52 and CPU 51 (S11). The CPU 51 supplies a laser-on signal to the laser driving circuit 55 to operate the laser driving circuit 55 in place of the beam control ASIC 52. The CPU 51 provides control such that the motor driving circuit 53 supplies a predetermined motor pulse to the motor 45b using a predetermined timing, to rotate the motor 45b. Further, the laser-on signal is supplied to the laser driving circuit 55 to cause the semiconductor laser element 41 to emit a laser beam of a predetermined wavelength (S12).

The laser beam emitted by the semiconductor laser element 41 is polarized by the polygon mirror 45a and then guided to the beam position detecting sensor 48. The laser beam is detected by position detecting sensor 48 to cause the beam position detecting sensor 48 to output a laser beam detection signal. The laser beam detection signal is inputted to the CPU51 via the input circuit 49. Further, whether or not a laser beam available as a trigger to obtain a horizontal synchronizing signal has reached the beam position detecting sensor 48 is determined depending on whether or not the horizontal-synchronization detecting circuit 54 is outputting a horizontal synchronizing signal (S13).

If the horizontal-synchronization detecting circuit 54 is outputting a horizontal synchronizing signal (S13-YES), the ASIC 52 outputs image data (control image data) to the laser driving circuit 55 in order to drive the semiconductor laser element according to image data read by the scanner or the like (S14). On the other hand, if the horizontal-synchronization detecting circuit 54 is not outputting any horizontal synchronizing signals (S13-NO), it is determined that the horizontal-synchronization detecting circuit 54 has not outputted any horizontal synchronizing signals in spite of the laser-on signal supplied to the circuit 54. The CPU 51 thus detects an error in the horizontal-synchronization detecting circuit 54 (the CPU 51 checks an error-status signal from the laser driving circuit 55).

At step S14, the laser element 41 to which the image data (control image data) has been supplied emits a laser beam based on the image data read by the scanner section 10, according to a laser driving signal from the laser driving circuit 55 which corresponds to the control image data. At the same time, the CPU 51 monitors the horizontal synchronizing signal outputted by the horizontal-synchronization detecting circuit 54, for each line (S15).

At step S15, when the horizontal synchronizing signal is inputted to the ASIC 52 (S15-YES), the semiconductor laser element 41 outputs the laser beam based on the image data read by the scanner section 10, for each line according to the control image data outputted by the ASIC 52 (S16).

The CPU 51 refers to the horizontal synchronizing signal to determine whether or not to supply an image signal to the laser element 41, i.e. whether or not to input an image signal to the laser driving circuit 55 (S17). At step S17, if the beam control ASIC 52 is outputting control image data on the basis of a horizontal synchronizing signal used to drive the semiconductor laser element 41 (S17-NO), then steps S14 to S16 are repeated.

On the other hand, if no horizontal synchronizing signals are being outputted (S15-NO), the CPU 51 checks whether or not there is an error-status signal from the laser driving circuit 55. If an error-status signal is being outputted, an error in the horizontal synchronization detecting circuit 54 is detected in which the horizontal-synchronization detecting circuit 54 does not output any horizontal-synchronization detecting signals in spite of the control image data supplied to the laser driving circuit 55.

When the instruction to form an image, i.e. to carry out exposure is thus given or the power supply switch (not shown) of the copying apparatus is turned on to start an initial operation, to supply a predetermined control signal (a current or voltage) to the beam control ASIC 52 and CPU 51, the CPU 51 instructs the laser driving circuit 55 to be supplied with the laser-on signal. The CPU 51 also instructs the motor driving circuit 53 to be supplied with a motor pulse that enables the motor 45b to be rotated at a predetermined rotation speed. The polygon mirror 45a is thus rotated at the predetermined rotation speed.

Thus, a laser beam of a predetermined wavelength emitted by the semiconductor laser element 41 is polarized by the polygon mirror 45a and then formed into an image at a predetermined position on the photosensitive drum 23, the image extending substantially linearly along the axial direction of the photosensitive drum 23. Further, part of the laser beam is incident on the beam position detecting sensor 48. The laser beam incident on the beam position detecting sensor 48 is converted into a current of a magnitude corresponding to the intensity of the inputted light. The current obtained is then utilized to notify the CPU 51 whether or not there is any output from the beam position detecting sensor 48 and to output a horizontal synchronizing signal indicative of operational status of the horizontal-synchronization detecting circuit 54.

If it is detected that the horizontal-synchronization detecting circuit 54 is outputting a horizontal synchronizing signal, the beam control ASIC 52 is ensured to be able to output control image data. Accordingly, the beam control ASIC 52 can output control image data based on the horizontal-synchronization signal to the laser driving circuit 55 after a predetermined control signal has been supplied to the beam control ASIC 52 and before the first horizontal synchronizing signal is outputted.

On the basis of passage of a laser beam emitted in response to the laser-on signal from the CPU 51, the laser position detecting sensor 48 can detect that the laser beam has reached the predetermined position in the outer periphery of the photosensitive drum 23 (passage timing), the predetermined position being located in front of the exposure position X (image forming area). The laser position detecting sensor 48 can also detect this predetermined position. Thus, the semiconductor laser element 41 can emit a laser beam based on image data to the exposure position X in the outer periphery of the photosensitive drum 23.

In this manner, when the exposure device 21 is given the instruction to form an image, i.e. to carry out exposure with a laser beam corresponding to image data, the predetermined control signal is supplied to the CPU 51 and beam control ASIC 52. Then, in place of the control image data outputted by the beam control ASIC 52, the laser-on signal outputted by the CPU 51 causes the semiconductor laser element 41 to emit a laser beam of a predetermined wavelength.

Consequently, when a predetermined control signal is supplied to the beam control ASIC 52 and CPU 51, even if noise or the like causes the beam control ASIC 52 to malfunction or delays the startup of the beam control ASIC 52, the semiconductor laser element 41 uses a predetermined timing to output a laser beam having its intensity changed according to image data.

In the example in this embodiment, the laser beam is used as a light beam. However, it should be appreciated that the present invention is not limited to this aspect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A beam control device comprising:

a beam scanning section including a polarizing device which polarizes a light beam, to polarize the light beam so that the beam travels in a first direction;

horizontal synchronizing signal generating means for generating a horizontal synchronizing signal by detecting a light beam from the beam scanning section;

an application specific integrated circuit which controls a light beam from said beam scanning section according to image data, in response to the horizontal synchronizing signal from the horizontal synchronizing signal generating means; and a central processing unit which controls the polarizing device of the beam scanning section;

wherein after the application specific integrated circuit and the central processing unit have been activated, the central processing unit controls start of generation of a light beam by the beam scanning section, and if the horizontal synchronizing signal generating means generates a horizontal synchronizing signal, the integrated circuit starts controlling the light beam.

2. An image forming apparatus which forms an image based on an electrostatic latent image, the apparatus comprising:

a light source which emits light of a predetermined wavelength;

polarizing means for polarizing the light from the light source so that the light travels along a first direction;

horizontal synchronizing signal detecting means for detecting the light from the light source which has been polarized by the polarizing means and outputting a horizontal synchronizing signal on the basis of a result of the detection;

a first processing device which causes the light source to emit the light of the predetermined wavelength in response to the horizontal synchronizing signal from the horizontal synchronizing signal generating means; and a second processing device which associates the light of the predetermined wavelength from the light source, with image data and causes the polarizing means to polarize the light using a predetermined timing.

3. The image forming apparatus according to claim 2, wherein the horizontal synchronizing signal generating means is arranged at a position which is as optically distant as a position at which the light of the predetermined wavelength which has been polarized by the polarizing means using the predetermined timing is collected, and the horizontal synchronizing signal generating means detects that the laser beam emitted by the light source has reached a predetermined detected position.

4. The image forming apparatus according to claim 2, wherein for each light polarized by the polarizing means using the predetermined timing, the first processing device causes the light of the predetermined wavelength based on the image data to be emitted synchronously with the horizontal synchronizing signal outputted by the horizontal synchronizing signal generating means.

5. The image forming apparatus according to claim 2, wherein for each light polarized by the polarizing means using the predetermined timing, the second processing device checks whether or not the horizontal synchronizing signal generating means is outputting the horizontal synchronizing signal, before the first processing device causes the light of the predetermined wavelength to be emitted synchronously with the horizontal synchronizing signal.

6. The image forming apparatus according to claim 2, wherein the first processing device includes an application specific IC.

7. The image forming apparatus according to claim 2, wherein the second processing device includes an application specific IC.

* * * * *